(12) United States Patent
Snyder et al.

(10) Patent No.: US 6,315,652 B1
(45) Date of Patent: Nov. 13, 2001

(54) ABRASIVE TOOL INSERTS AND THEIR PRODUCTION

(75) Inventors: Shelly R. Snyder; Eoin M. O'Tighearnaigh, both of Columbus, OH (US)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 09/845,540

(22) Filed: Apr. 30, 2001

(51) Int. Cl.[7] ............................... B23F 21/03; B23F 21/23
(52) U.S. Cl. ......................... 451/540; 451/548; 175/428
(58) Field of Search ................................. 451/540, 548; 175/426, 428, 432, 434; 299/79; 76/108.2, DIG. 12; 407/32, 11 B, 119

(56) References Cited

U.S. PATENT DOCUMENTS

| | | |
|---|---|---|
| 4,784,023 | 11/1988 | Dennis . |
| 4,972,637 | 11/1990 | Dyer . |
| 5,007,207 | 4/1991 | Phaal . |
| 5,484,330 | 1/1996 | Flood et al. . |
| 5,486,137 | 1/1996 | Flood et al. . |
| 5,494,477 | 2/1996 | Flood et al. . |

Primary Examiner—Derris H. Banks
(74) Attorney, Agent, or Firm—Mueller and Smith, LPA

(57) ABSTRACT

An abrasive tool insert if formed from a substrate having a face and a continuous abrasive layer having a center, a periphery forming a cutting edge, being integrally formed on the substrate, and defining an interface therebetween. The interface is formed in a sawtooth pattern of concentric rings extending from said center to the periphery. Radially outwardly sloping troughs extending from the center to the periphery are superimposed on the concentric rings. The profile of the interface slopes downwardly from the center to the periphery. The abrasive layer advantageously is diamond and the substrate advantageously is metal cemented carbide.

15 Claims, 2 Drawing Sheets

ABRASIVE TOOL INSERTS AND THEIR PRODUCTION

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates to the field of abrasive tool inserts and, more particularly, to such inserts having a support having a sawtooth pattern of concentric rings having superimposed radially outwardly sloping troughs extending from the center of the support to its periphery and wherein the profile of the substrate from its center to its periphery slopes downwardly.

Abrasive compacts are used extensively in cutting, milling, grinding, drilling and other abrasive operations. An abrasive particle compact is a polycrystalline mass of abrasive particles, such as diamond and/or cubic boron nitride (CBN), bonded together to form an integral, tough, high-strength mass. Such components can be bonded together in a particle-to-particle self-bonded relationship, by means of a bonding medium disposed between the particles, or by combinations thereof. The abrasive particle content of the abrasive compact is high and there is an extensive amount of direct particle-to-particle bonding. Abrasive compacts are made under elevated or high pressure and temperature (HP/HT) conditions at which the particles, diamond or CBN, are crystallographically stable. For example, see U.S. Pat. Nos. 3,136,615, 3,141,746, and 3,233,988.

A supported abrasive particle compact, herein termed a composite compact, is an abrasive particle compact, which is bonded to a substrate material, such as cemented tungsten carbide.

Abrasive compacts tend to be brittle and, in use, they frequently are supported by being bonded to a cemented carbide substrate. Such supported abrasive compacts are known in the art as composite abrasive compacts. Compacts of this type are described, for example, in U.S. Pat. Nos. 3,743,489, 3,745,623, and 3,767,371. The bond to the support can be formed either during or subsequent to the formation of the abrasive particle compact. Composite abrasive compacts may be used as such in the working surface of an abrasive tool.

Composite compacts have found special utility as cutting elements in drill bits. Drill bits for use in rock drilling, machining of wear resistant materials, and other operations which require high abrasion resistance or wear resistance generally consist of a plurality of polycrystalline abrasive cutting elements fixed in a holder. Particularly, U.S. Pat. Nos. 4,109,737 and 5,374,854, describe drill bits with a tungsten carbide stud (substrate) having a polycrystalline diamond compact on the outer surface of the cutting element. A plurality of these cutting elements then are mounted generally by interference fit into recesses into the crown of a drill bit, such as a rotary drill bit. These drill bits generally have means for providing water-cooling or other cooling fluids to the interface between the drill crown and the substance being drilled during drilling operations. Generally, the cutting element comprises an elongated pin of a metal carbide (stud) which may be either sintered or cemented carbide (such as tungsten carbide) with an abrasive particle compact (e.g., polycrystalline diamond) at one end of the pin for form a composite compact.

Fabrication of the composite compact typically is achieved by placing a cemented carbide substrate into the container of a press. A mixture of diamond grains or diamond grains and catalyst binder is placed atop the substrate and compressed under HP/HT conditions. In so doing, metal binder migrates from the substrate and "sweeps" through the diamond grains to promote a sintering of the diamond grains. As a result, the diamond grains become bonded to each other to form a diamond layer, which concomitantly is bonded to the substrate along a conventionally planar interface. Metal binder can remain disposed in the diamond layer within pores defined between the diamond grains.

A composite compact formed in the above-described manner may be subject to a number of shortcomings. For example, the coefficients of thermal expansion and elastic constants of cemented carbide and diamond are close, but not exactly the same. Thus, during heating or cooling of the polycrystalline diamond compact (PDC), thermally induced stresses occur at the interface between the diamond layer and the cemented carbide substrate, the magnitude of these stresses being dependent, for example, on the disparity in thermal expansion coefficients and elastic constants.

Another potential shortcoming, which should be considered, relates to the creation of internal stresses within the diamond layer, which can result in a fracturing of that layer. Such stresses also result from the presence of the cemented carbide substrate and are distributed according to the size, geometry, and physical properties of the cemented carbide substrate and the polycrystalline diamond layer.

Recently, various PDC structures have been proposed in which the diamond/carbide interface contains a number of ridges, grooves, or other indentations aimed at reducing the susceptibility of the diamond/carbide interface to mechanical and thermal stresses. In U.S. Pat. No. 4,784,023, a PDC includes an interface having a number of alternating grooves and ridges, the top and bottom of which are substantially parallel with the compact surface and the sides of which are substantially perpendicular to the compact surface.

U.S. Pat. No. 4,972,637 proposes a PDC having an interface containing discrete, spaced-apart recesses extending into the cemented carbide layer, the recesses containing abrasive material (e.g., diamond) and being arranged in a series of rows, each recess being staggered relative to its nearest neighbor in an adjacent row. It is asserted in the '637 patent that as wear reaches the diamond/carbide interface, the recesses, filled with diamond, wear less rapidly than the cemented carbide and act, in effect, as cutting ridges or projections. When the PDC is mounted on a stud cutter, as shown in FIG. 5 of the '637 patent, wear plane 38 exposes carbide regions 42, which wear more rapidly than the diamond material in the recesses 18. As a consequence, depressions develop in these regions between the diamond filled recesses. The '637 patent asserts that these depressed regions, which expose additional edges of diamond material, enhance the cutting action of the PDC.

U.S. Pat. No. 5,007,207 proposes an alternative PDC structure having a number of recesses in the carbide layer, each filled with diamond, which recesses are formed into a spiral or concentric circular pattern (looking down at the disc shaped compact). Thus, the '207 structure differs from the '637 structure in that, rather than employing a large number of discrete recesses, the '207 structure uses one or a few elongated recesses which form a spiral or concentric circular pattern. FIG. 5 in the '207 patent shows the wear plane, which develops when the PDC is mounted and used on a stud cutter. As with the '637 structure, the wear process creates depressions in the carbide material between the diamond filled recesses in the '207 structure. Like the '207 patent, the '637 patent also asserts that these depressions, which develop during the wear process, enhance cutting action.

U.S. Pat. No. 5,484,330 proposes an abrasive tool insert wherein the carbide support forms a sawtooth shaped cross-sectional profile that includes a number of surfaces sloping outwardly and downwardly toward a cutting edge of the insert.

U.S. Pat. No. 5,486,137 proposes an abrasive tool insert having an abrasive particle layer having an upper surface, an outer periphery, and a lower surface integrally formed on a substrate which defines an interface therebetween. The abrasive particle layer outer periphery forms a cutting plane. The thickness of the abrasive particle layer at its outer periphery cutting plane decreases radially inwardly. Thus, the interface can have a sawtooth shape cross-sectional profile, at least one slot extending from said abrasive particle layer outer periphery radially inwardly, or other configuration based on the precepts of the present invention. Also, the angle of the outwardly sloping profile can be matched to the anticipated angle of the wear plane, which will develop as the PDC wears in use.

U.S. Pat. No. 5,494,477 proposes an abrasive tool insert comprises a cemented substrate and a polycrystalline diamond layer formed thereon by high pressure, high temperature processing. The interface between the substrate and the diamond layer comprises at least one angled profile wherein said profile slopes downwardly and outwardly toward the periphery of the insert.

Whereas the aforementioned patents assert a desirable cutting action in the rock, it is also highly desirable to minimize the diamond layers susceptibility to fracture and spall which in part arises from the internal residual stresses.

Accordingly, it would be highly desirable to provide a polycrystalline diamond compact having increased resistance to diamond spalling fractures.

BRIEF SUMMARY OF THE INVENTION

An abrasive tool insert if formed from a substrate having a face and a continuous abrasive layer having a center, a periphery forming a cutting edge, being integrally formed on the substrate, and defining an interface therebetween. The interface is formed in a sawtooth pattern of concentric rings extending from said center to the periphery. Radially outwardly sloping troughs extending from the center to the periphery are superimposed on the concentric rings. The profile of the interface slopes downwardly from the center to the periphery. The abrasive layer advantageously is diamond and the substrate advantageously is metal cemented carbide.

Also disclosed is a method for forming an abrasive tool insert, which commences with providing a substrate having a face. Next, on the face is formed a sawtooth pattern of concentric rings extending from the center to the periphery, superimposed on the concentric rings are radially outwardly sloping troughs extending from the center to the periphery, the profile of the interface sloping downwardly from the center to the periphery. Finally, a continuous abrasive layer having a center and a periphery forming a cutting edge is integrally formed on the substrate.

Advantages of the present invention include the increase of the useful life of abrasive tool inserts by reducing the residual tensile stresses in the abrasive layer at locations where spalling and delamination typically occur. Another advantage is the ability to increase mechanical interlocking between the diamond cutting layer and the carbide support. A further advantage is the ability to reduce tensile stresses in the area of the polycrystalline cutter, which is the cutting edge. These and other advantages will be readily apparent to those skilled in the art.

BRIEF DESCRIPTION OF THE DRAWINGS

For a fuller understanding of the nature and advantages of the present invention, reference should be had to the following detailed description taken in connection with the accompanying drawings, in which.

The drawings will be described in detail below.

DETAILED DESCRIPTION OF THE INVENTION

Figure 1:
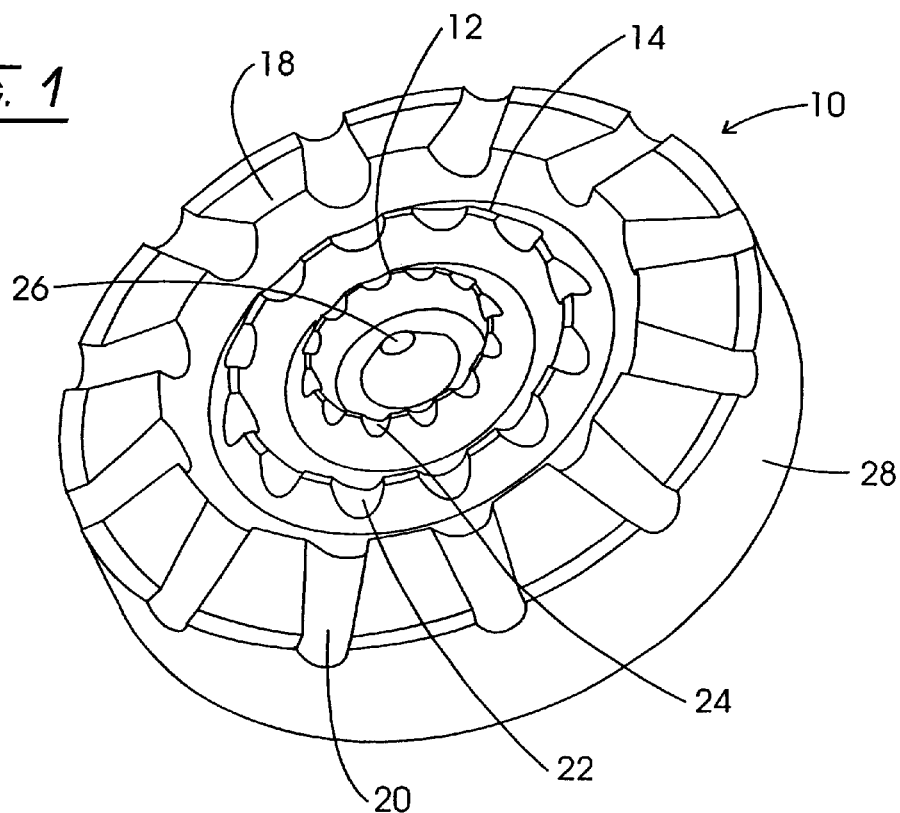
FIG. 1 is a perspective view of one embodiment of the interface configuration of the present invention.
Figure 2:
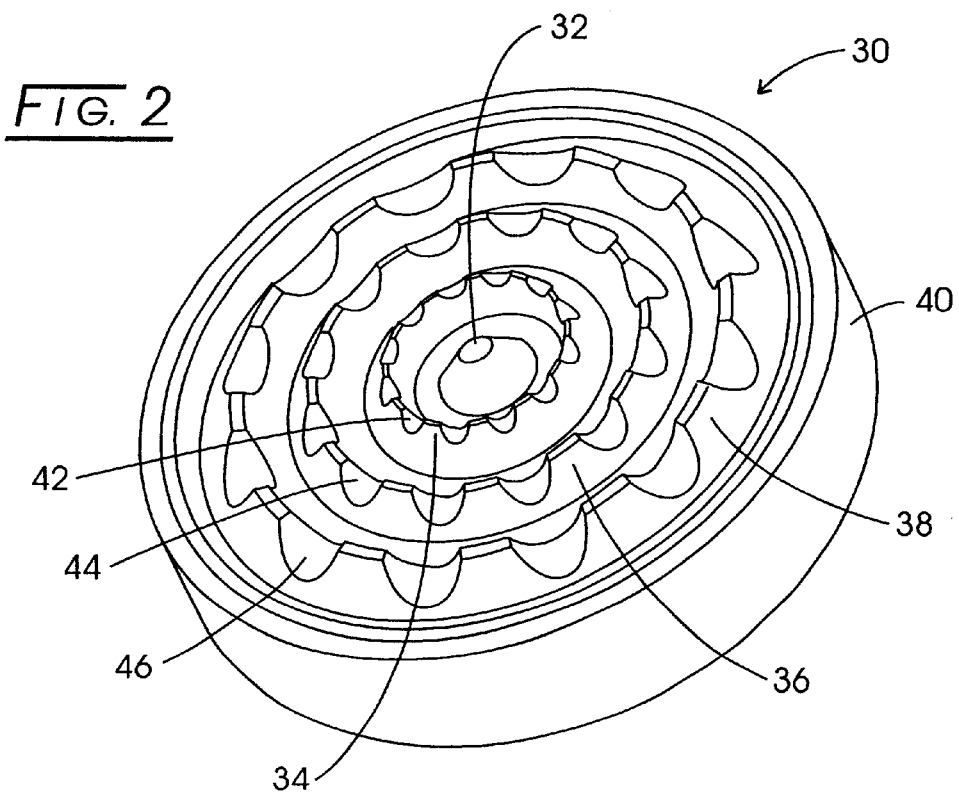
FIG. 2 is a perspective view of another embodiment of the interface configuration of the present invention.

The shape of the carbide support in FIGS. 1 and 2 is unique in that it contains 2 distinctive superimposed patterns that contribute together to improving cutter performance. Referring initially to FIG. 1, cutter support 10 is seen in perspective view to be composed of a generally flat cylindrical shape with a flat bottom (not seen in FIG. 1) and an annual straight side. Unique to support 10 is the pattern on its upper surface that forms the interface with an upper cutting layer of polycrystalline or other super hard material. Specifically, the interface surface is seen to contain a sawtooth pattern of concentric rings (annular sawtooth-patterned rings) 12, 14, and 16. Teeth, such as typified by tooth 18 of annual ring 16, can be formed in a variety of configurations including square, chisel, pointed, etc. While 3 annual rows of teeth are shown in FIG. 1, such number can be lesser or greater.

Superimposed on sawtooth annuli 12, 14, and 16 and troughs, as illustrated by trough segments 20, 22, and 24 formed in rings 16, 14, and 12, respectively, which extend from the center of support 10 to the outer periphery of support 10. Twelve such troughs are illustrated in FIG. 1, although a greater or lesser number of such troughs can be provided.

Lastly, the profile of the interface of support 10 slopes downwardly from center 26 to side surface 28 of support 10. This means that each successive annular sawtooth ring from the center to the periphery of support 10 is lower than its neighboring inner ring. In FIG. 1, this means that the profile of the interface the highest at center 26 at the lowest at ring 16 with rings 14 and 16 each being lower than its neighboring annular ring to the inside. The outwardly sloping interface profile can be straight or arcuate.

A similar pattern is depicted in FIG. 2. That is, support 30 is seen to have center 32; annular rings 34, 35, and 38; annular side 40; and troughs, such as formed from trough segments 42, 44, and 46. Again, 3 annular rings are shown for illustration purposes and not by way of limitation. Also, 12 troughs are shown for illustration purposes and not by way of limitation. Also, the interface slopes downwardly from center 32 to outer ring 38.

The polycrystalline upper layer preferably is polycrystalline diamond (PCD). However, other materials that are included within the scope of this invention are synthetic and natural diamond, cubic boron nitride (CBN), wurtzite boron nitride, combinations thereof, and like materials. Polycrystalline diamond, however, is the preferred polycrystalline layer. The cemented metal carbide substrate is conventional in composition and, thus, may be include any of the Group IVB, VB, or VIB metals, which are pressed and sintered in the presence of a binder of cobalt, nickel or iron, or alloys thereof. The preferred metal carbide is tungsten carbide.

Further, in the practice of this invention, while the outer surface configuration of the diamond layer is not critical, it is preferred that the layer be essentially hemispherical. The surface configuration of the diamond layer also may be planar, conical, reduced or increased radius, chisel, or non-axisymmetric in shape. In general, all forms of tungsten carbide inserts used in the drilling industry may be enhanced by the addition of a diamond layer, and further improved by the current invention by addition of a pattern of ridges, as disclosed herein.

The disclosed abrasive tool insert is manufactured by conventional high pressure/high temperature (HP/HT) techniques well known in the art. Such techniques are disclosed, inter alia, in the art cited above.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLE

Impact resistance data was collected in accordance with the following test procedure:

Parkson Mill Parameters

Compound Tool—7° radial/12° axial

Red Mountain Granite Workpiece 350 rpm cutting speed

3"/min (7.62 cm/min) feed rate

No coolant

The inventive cutter as illustrated in FIG. 2 was compared to a conventional right cylindrical cutter (similar to cutters described in U.S. Pat. Nos. 5,484,330, 5,486,137, and 5,494,477, GE Superabrasives, Worthington, Ohio, US) with a diamond table of approximately the same thickness. Two identical runs were conducted. The following data was recorded:

TABLE 1

| CUTTER TYPE | RUN 1<br>NUMBER OF PASSES<br>(2,080 Impacts/Pass) | RUN 2<br>IMPACT ENERGY<br>(2,080 Impacts/Pass) |
| --- | --- | --- |
| Conventional | 2,600 | 2,766 |
| Inventive | 10,400 | 15,600 |

Figure 3:
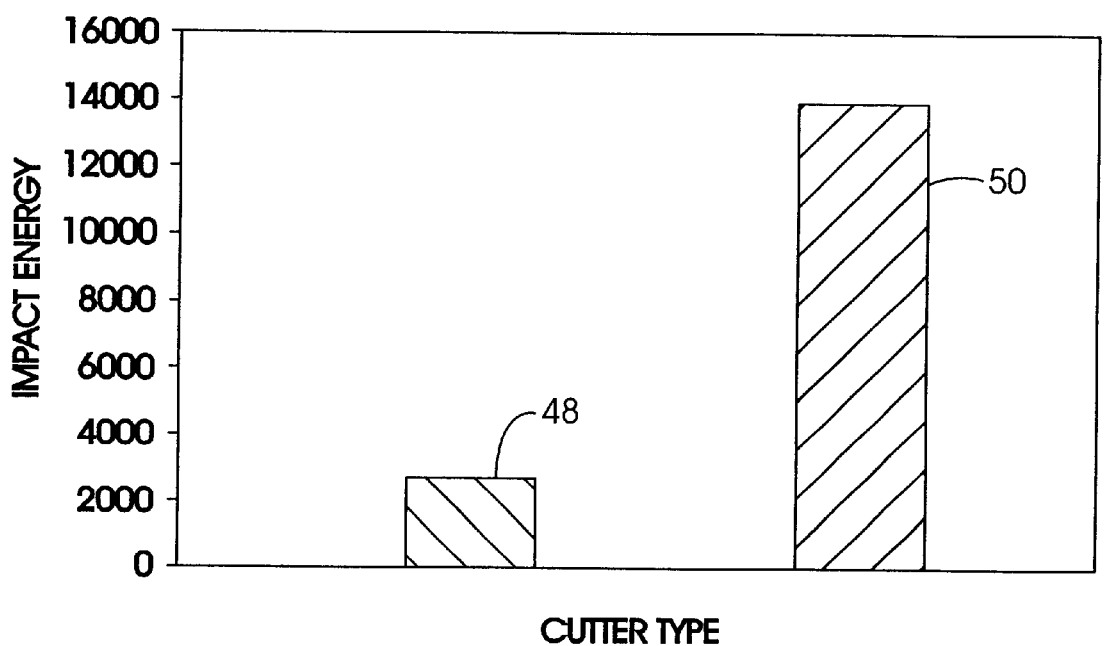
FIG. 3 is a graph of the impact energy versus cutter type for a conventional cutter element versus a cutter element having the profile as depicted in FIG. 2.

The above-tabulated data is depicted in FIG. 3, wherein bar 48 represents the average of the two runs for the conventional cutter and bar 50 represents the average of the two runs for the cutter having the interface as depicted in FIG. 2.

These results demonstrate that the inventive cutters show improved impact performance, which is a critical to customer quality. Furthermore, experimental field-testing results have substantiated this data by showing a 3× improvement in ROP (rate of penetration) and a 50% reduction in WOB (weight on bit) compared to the current commercial cutters described in U.S. Pat. Nos. 5,484,330, 5,486,137, and 5,494,477.

We claim:

1. An abrasive tool insert, which comprises:
   (a) a substrate having a face;
   (b) a continuous abrasive layer having a center, a periphery forming a cutting edge, being integrally formed on said substrate, and defining an interface therebetween, wherein said interface comprises a sawtooth pattern of concentric rings extending from said center to said periphery, superimposed on said concentric rings are radially outwardly sloping troughs extending from said center to said periphery, the profile of said interface sloping downwardly from said center to said periphery.

2. The abrasive tool insert of claim 1, wherein said substrate comprises cemented metal carbide.

3. The abrasive tool insert of claim 2, wherein said cemented metal carbide is selected from the group consisting essentially of Group IVB, Group VB, and Group VIB metal carbides.

4. The abrasive tool insert of claim 3, wherein said abrasive layer is selected from the group consisting essentially of diamond, cubic boron nitride, wurtzite boron nitride, and combinations thereof.

5. The abrasive tool insert of claim 1, wherein said abrasive layer is selected from the group consisting essentially of diamond, cubic boron nitride, wurtzite boron nitride, and combinations thereof.

6. A method for forming an abrasive tool insert, which comprises the steps of:
   (a) providing a substrate having a face;
   (b) forming on said face a sawtooth pattern of concentric rings extending from said center to said periphery, superimposed on said concentric rings are radially outwardly sloping troughs extending from said center to said periphery, the profile of said interface sloping downwardly from said center to said periphery; and
   (c) integrally forming on said substrate a continuous abrasive layer having a center and a periphery forming a cutting edge.

7. The method of claim 6, wherein said substrate comprises cemented metal carbide.

8. The method of claim 7, wherein said cemented metal carbide is selected from the group consisting essentially of Group IVB, Group VB, and Group VIB metal carbides.

9. The method of claim 8, wherein said abrasive layer is selected from the group consisting essentially of diamond, cubic boron nitride, wurtzite boron nitride, and combinations thereof.

10. The method of claim 6, wherein said abrasive layer is selected from the group consisting essentially of diamond, cubic boron nitride, wurtzite boron nitride, and combinations thereof.

11. A method for improving impact performance of an abrasive tool insert, which comprises the steps of:
  (a) providing a substrate having a face;
  (b) forming on said face a sawtooth pattern of concentric rings extending from said center to said periphery, superimposed on said concentric rings are radially outwardly sloping troughs extending from said center to said periphery, the profile of said interface sloping downwardly from said center to said periphery; and
  (c) integrally forming on said substrate a continuous abrasive layer having a center and a periphery forming a cutting edge.

12. The method of claim 11, wherein said substrate comprises cemented metal carbide.

13. The method of claim 12, wherein said cemented metal carbide is selected from the group consisting essentially of Group IVB, Group VB, and Group VIB metal carbides.

14. The method of claim 13, wherein said abrasive layer is selected from the group consisting essentially of diamond, cubic boron nitride, wurtzite boron nitride, and combinations thereof.

15. The method of claim 11, wherein said abrasive layer is selected from the group consisting essentially of diamond, cubic boron nitride, wurtzite boron nitride, and combinations thereof.

* * * * *